Jan. 15, 1935.  C. D. AVERY  1,988,230
AUTOMATIC TOASTER
Filed Oct. 15, 1930   2 Sheets-Sheet 2
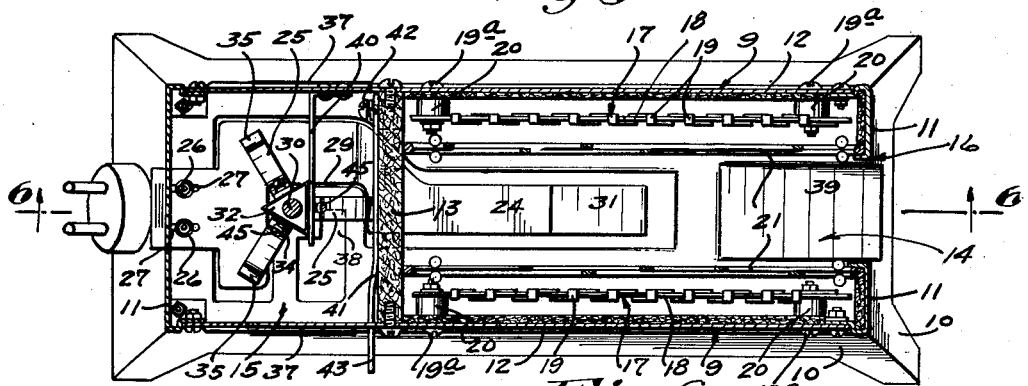
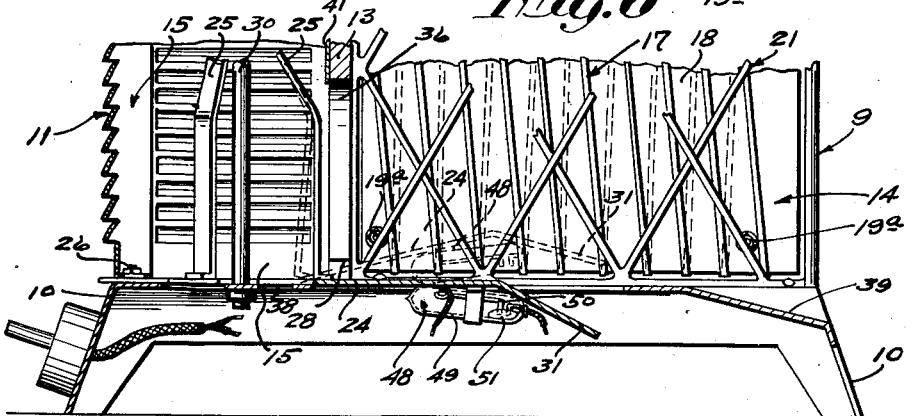
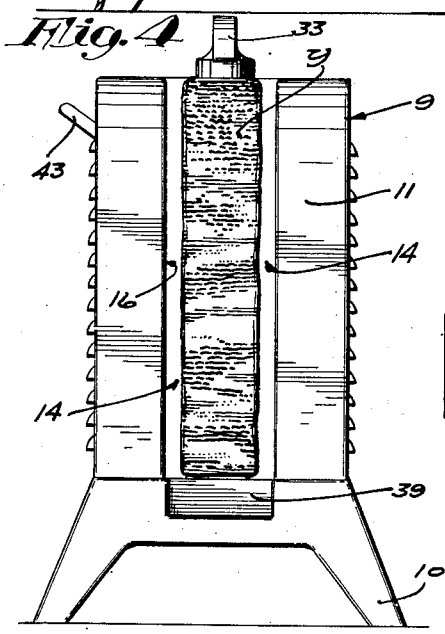
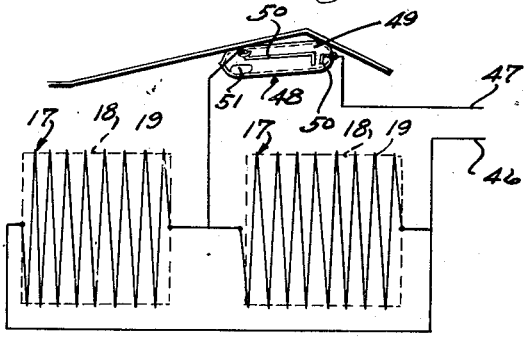
Inventor
Clinton D. Avery
By his Attorney
Merchant & Kilene Patented Jan. 15, 1935

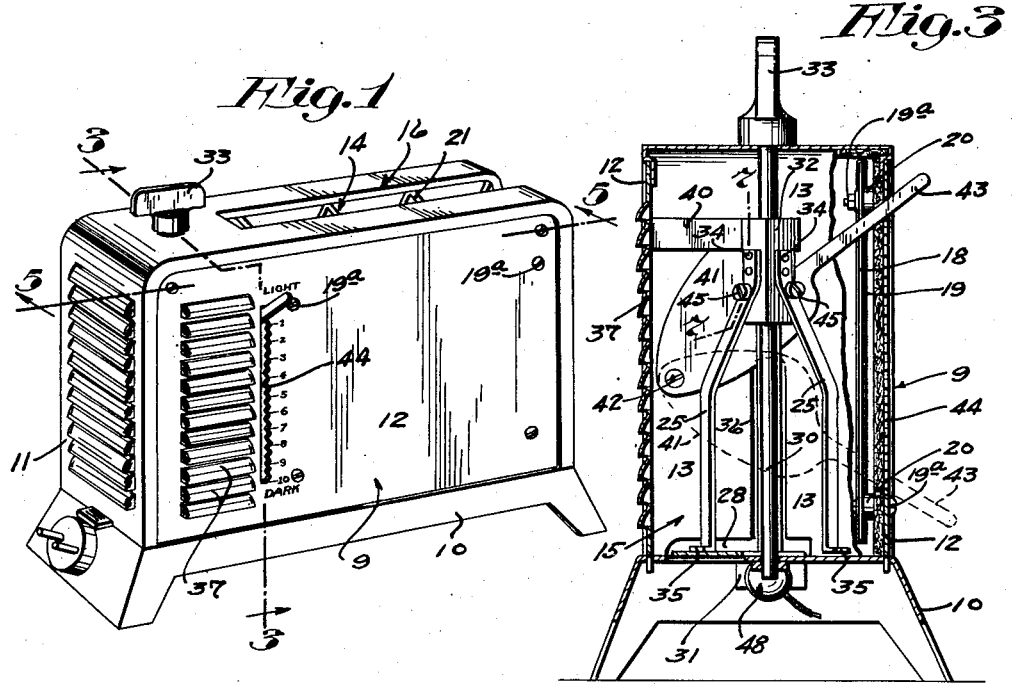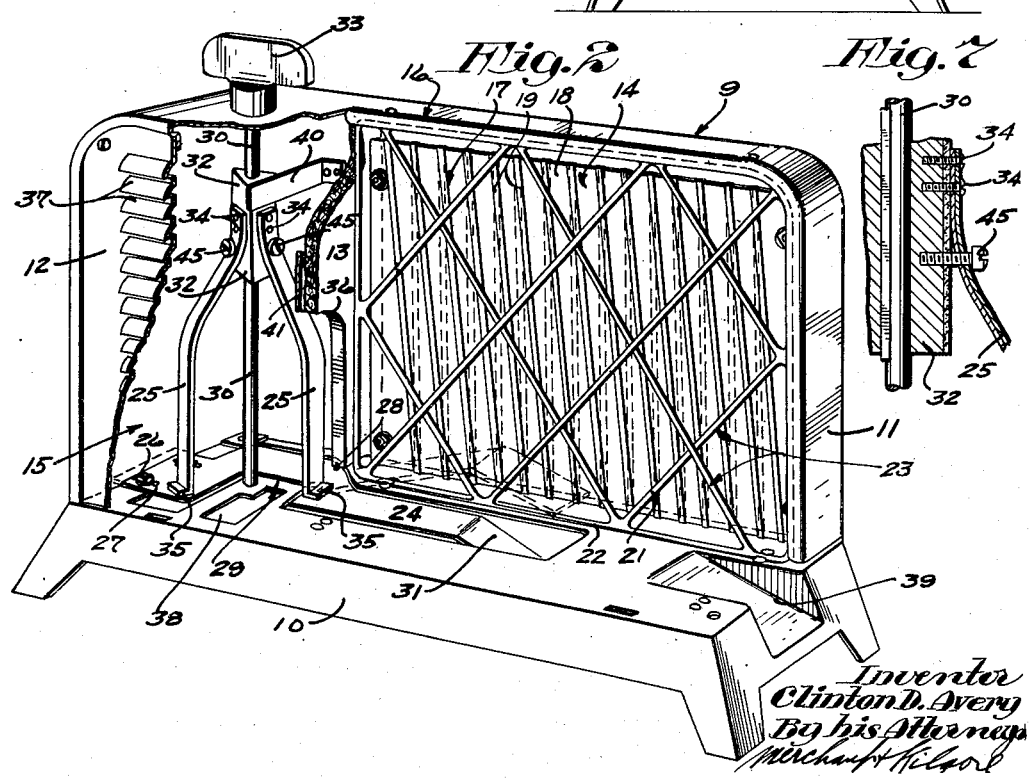

1,988,230

UNITED STATES PATENT OFFICE 1,988,230

AUTOMATIC TOASTER

Clinton D. Avery, Minneapolis, Minn.

Application October 15, 1930, Serial No. 488,891

13 Claims. (Cl. 219—19)

This invention relates particularly to automatic toasters but incorporates features that are capable of broader application.

Generally stated, the invention consists of novel devices, combinations of devices and arrangement of parts hereinafter described and defined in the claims.

An important object of the invention is the provision of an extremely simple, highly efficient and relatively inexpensive automatic toaster wherein the timing of the successive toasting operations is controlled by a plurality of heat responsive elements. As illustrated in the drawings and described in detail in the following specification, my invention includes a plurality of heat responsive timing elements that are adapted and arranged for successive operation and further arranged so that an inoperative heat responsive timing element is permitted to cool while the operatively arranged one thereof is being heated. With my arrangement the heat responsive element, that is substantially in normal condition, is brought into operation to control the timing interval of each toasting period so that a very rapid succession of equally timed toasting periods is permitted. All of the objects of my invention, including the above noted, will be clearly pointed out in the following specification.

In the accompanying drawings, which illustrate the invention, like characters indicate like parts throughout the several views.

Referring to the drawings:

Fig. 1 is a perspective view of the complete toaster showing the front and one side thereof;

Fig. 2 is a perspective view similar to Fig. 1 but looking at the opposite or front end of a toaster and one side portion thereof being broken away;

Fig. 3 is a transverse vertical section taken on the line 3—3 of Fig. 1;

Fig. 4 is a front end elevation of the toaster;

Fig. 5 is a horizontal section of a toaster taken on the line 5—5 of Fig. 1;

Fig. 6 is a longitudinal vertical section of the toaster taken on the line 6—6 of Fig. 5, some parts thereof being broken away;

Fig. 7 is a detail sectional view taken on the line 7—7 of Fig. 3; and

Fig. 8 is a diagrammatic view showing the electrical hook-up of the heating elements.

The toaster includes a casing 9 comprising a base 10, a U-shaped top and end forming member 11, a pair of removable side plates 12, and a partition wall 13 of heat resisting material within the casing 9 and dividing said casing into two compartments, to wit: a toasting compartment or oven 14 and a timing mechanism compartment 15. This partition wall 13 may be of any suitable heat resisting material such as fibres or a relatively stiff sheet of asbestos or the like. The toasting oven 14 opens through the top and one end of the casing member 11 at 16 to permit insertion of bread into the oven and rejection of toasting bread therefrom, as will be hereinafter described.

The means, illustrated for heating the toasting oven 14, comprises spaced heating elements 17 at opposite sides of the opening 16. These elements 17 are, in the form illustrated, of well-known conventional form, each comprising a sheet of mica or the like 18 having a heating element wire 19 wound thereon. The heating elements are secured to the casing side plates 12 in spaced relation thereto and to the opening 16 by nut-equipped bolts 19ª having spaced sleeves 20 thereon. At opposite sides of the opening 16, substantially aligned therewith and spaced from the heating elements are bread positioning grilles or the like 21 that are illustrated as being made up of side frames 22 and intersecting wire bars 23 that are welded or otherwise secured to the frames 22. The frames 22 of the grilles 21 are suitably secured to the in-turned flanges 24 of the top and end forming casing member 11 at the side of the opening 16 and to the base 10.

A slice of bread $y$, inserted into the toasting oven, is obviously held in a vertical position and properly spaced from the opposed heating elements by the grilles 21.

As a means for ejecting toasted bread from the toasting oven 14, at the completion of a toasting operation, I provide a leaf ejecting spring 24 that is normally under strain to eject bread $y$ from the oven and out of the cooking or toasting range of the heating elements 17, and which ejecting spring is adapted and arranged to be successively connected upon by a plurality of heat responsive timing latches 25 to be retracted thereby and held retracted during a toasting operation and to be loosed therefrom at the completion of a toasting operation and permitted to eject toasted bread from the oven. The ejecting spring 24 is adjustably secured to the top of the base 10, within the timing mechanism compartment 15, by means of nut-equipped bolts or the like 26 that work through slots 27 in the rear fixed end portion of the spring 24 and said ejecting spring extends through a notch-like opening 28 in the partition wall 13, near the bottom thereof, and its free end portion works within the toasting oven 14. This ejecting spring 24, near its fixed rear portion, is expanded, and the said expanded portion thereof is notched out at 29 to receive and work freely around a latch mounting and operating spindle 30 and for other purposes hereinafter mentioned.

By reference especially to the dotted lines in Fig. 6, it will be noted that the spring 24, in its natural or ejected condition wherein it is not under strain or tension, is curved upwardly intermediate its fixed rear end and a point approximately opposite the front of the notch 29 therein so that the free end portion thereof extends a considerable distance above the base 10 and into the toasting oven 15. Underlying the spring 24 and extending from a point forward thereof to a point close to its attachment with the base 10, said base is cut away to permit the down-turned end 31 of said spring to work therethrough and to eliminate the possibility of dirt or crumbs getting thereunder and retard its free action.

The heat responsive timing latches 25, as illustrated, each comprise a heat responsive element in the form of a bi-metallic strip. These strips are secured at their upper ends each to one face of a triangular mounting block 32 that is mounted on and for movements with the spindle 30, which spindle is journaled at its lower end portion at its base 10, and its upper end portion is journaled in and extends beyond the top of the casing 11 and is provided with a suitable operating knob or the like 33. The bi-metallic strips 25 are secured to the insulating block 32 by means of screws, rivets or the like 34 and are bent outward from approximately their point of attachment with said block, and are formed at their bottoms with out-turned ejector spring engaging feet 35. The bi-metallic strips 25, it will be noted by full lines in the drawings, are normally bent outward to such an extent that when one thereof is rotated to a forward or operative position, the entire bottom of the foot thereof will engage the ejecting spring 24 just forward of the notch 29 therein, and said strips 25 are of sufficient length so that an operatively positioned one thereof will normally hold the ejecting spring in a retracted position wherein it is under strain to move material, such as bread $y$ of the oven 14 by a kind of kicking action, hereinafter explained.

The heat responsive bi-metallic latches 25 are arranged so that an operatively positioned latch is within heating range of and subject to heat from the heating elements 17 in the toasting oven 14 during a toasting operation and others thereof are in a position remote from the heating element wherein they are permitted to cool or remain cool as the case may be. This is preferably accomplished by arranging the latches so that an operatively positioned latch will be in close proximity to the heat resisting wall or partition 13 and providing the partition with an aperture 36 directly in front of the operative positioned latch.

The aperture 36 is preferably of approximately the same width but not of materially greater width than the latches 25 so that heat from the oven 14 will have sufficient effect on the operative heat responsive latch and said operatively positioned latch will act to quite an extent to close the aperture and prevent an undesirable heating of the compartment 15 and the inoperative latches therein. There will, of course, be some heat from the oven 14, which will escape or radiate into the compartment 15 but this is readily dissipated to the atmosphere through a series of louver openings 37 in the sides and back of the compartment 15 and by further providing an opening or openings 38 in the base 10 underlying the compartment so that a continual draft or flow of air through the compartment is maintained during the operation of the toaster.

It will now be understood that when the heating elements are supplied with the necessary electric energy for a toasting operation and the ejecting spring 24 is in a retracted position, as shown by full lines in the drawings, the operative latch 25 will be subject to heat from the elements and will warp inwardly in response thereto toward the spindle 30 so that the foot 35 thereof will gradually move rearwardly over the spring 24 until it trips into the notch 29 thereof and releases said spring and permits the same to move by its own tension or strain to an upward or ejected position. Bread, inserted into the oven 14 for a toasting operation, rests on and is supported at its bottom, partially by the base 10 and partially by the free end portion of the retracted spring 24 and at its sides, the bread is supported in a vertical position and in proper spaced relation to the heating elements 17 by the grilles 21. The spring 24 underlies the rear portion of the oven 14 and is operative directly upon the rear bottom portion of the bread or toasted bread $y$ so that when a latch is tripped at the completion of a toasting operation, the released ejecting spring will kick the rear end of the toast upward and forward and impart thereto a gentle combined rolling and sliding action which will cause the toast to roll or slide out of the open front portion of the oven where it may be caught in a suitable receptacle.

Forward ejecting movements of the toast are aided materially by downwardly and forwardly sloping the front or free end portion of the ejecting spring, as indicated at 31, which causes the spring during its ejecting movement to slide the toast off the sloped end thereof toward the open end of the oven. As another aid to ease the ejection of toast from the front end portion of the base 10 is provided with a downwardly sloped detent 39.

After an operatively positioned latch 25 has become heated and responded to heat from the element and performed its function by tripping and releasing the ejecting spring, it must be permitted to cool and come back to a natural condition before it is again ready for operation and, of course, to render the toaster ready for another toasting period the ejecting spring must be reset to a retracted position and a cool or normal latch must be moved into operative position. This resetting of the ejecting spring and positioning of a cool latch to an operative position for a new toasting period is readily and easily accomplished by a single manipulation, to wit: turning of the knob 33 one-third of a complete revolution in a clock wise direction. It is now important to note that the two inoperatively positioned latches 25 overlie and are freely slidable over the rear substantially non-movable portion of the ejecting spring and with this in mind and by referring to Figs. 2 and 6, it will be readily seen that movement of the last used latch to an inoperative cooling position and the next thereof in operative succession to an operative position will be simultaneous and that the foot of a next operative latch on its movement to an operative position will engage the upwardly sloping surface of the released ejecting spring and by cam action thereon press the same downwardly against strain or tension to a retracted normal condition wherein it is set for another timed toasting.

Proper positioning of the latches 25 is rendered an easy matter by means of a spring arm 40 that is suitably secured to one side of the casing within the compartment 15 and projects therefrom at substantially right angles thereto and engages under tension the front side of the triangular mounting member 32. This spring permits turning of the complete rotary assembly but is of sufficient strength to at all times maintain the rotary assembly in position where one of the latches 25 is in operative position and by feel, the operator can easily tell when he has turned the knob 33 the correct distance to reset the mechanism.

Variations in the timing of a toasting interval or in other words variations in the amount of heat applied to the bread are readily accomplished by means of a shutter 41 that is pivotally secured to the back of the partition 13 at 42 and arranged to be adjusted by means of a spindle or stem 43 that works through a slot 44 in the casing, and by manipulation of which spindle the aperture 36 may be partially closed. By thus partially closing the aperture 36, the amount of heat received by an operative latch and therefor the time required for the latch to trip and terminate the toasting period may be regulated to meet individual requirements and the bread may be toasted to any desired degree. As illustrated, a graduated scale is provided at the side of the slot 44 to aid in proper regulation of the toasting period. The several latches 25 are each provided with an independent adjustment means in the form of a screw 45, which screws may be employed during original adjustment of the toaster so that each latch may be adjusted to require a like time to trip under like conditions.

The hook-up for the heating elements includes power leads 46 and 47 connected in multiple thereto and a mercury bulb switch 48 interposed in the supply lead 47. This switch comprises a glass bulb 49, spaced electrodes 50 near one side of the bulb, and a globule of mercury 51. The switch bulb 49 is carried by and for movements with the free end portion of the ejecting spring 24 and is arranged so that it is tilted to a closed position wherein the mercury closes the gap between the electrodes when the ejected spring is retracted but is tilted to an open position when the ejecting spring is in an ejected position. By this simple switch arrangement, the supply circuits to the heating elements is automatically broken at the completion of each toasting period and automatically completed at the start of each toasting period, the closing of the switch and opening thereof being simultaneous with the setting of the ejecting spring.

Toast may be ejected from the toasting oven 14 in advance of the completion of a toasting operation by imparting a slight rotary movement to the heat responsive latches 25 by manipulation of the knob 33. Such rotary movement should be in a clockwise direction and sufficient to move the foot 35 of the operatively positioned latch 25 out of engagement with the ejecting spring 24.

What I claim is:

1. In a toaster having a heating element, means for supporting bread in close relation to the heating element and to move the bread therefrom at the completion of a toasting operation including a device that is normally under strain to move the toast away from the element, a plurality of heat responsive latches, each including a heat responsive element, said latches being mounted for common movements and acting successively upon the said device that is normally under strain to move the bread away from the heating element to reset the same in a retracted position and to hold the same retracted during the toasting period, the heat responsive element of an operatively positioned latch being subject to heat from the heating element and responsive thereto to trip the latch, and an inoperative heat responsive latch being in a cooling position remote from the heating element.

2. In a toaster having a heating element, means for supporting bread in close relation to the heating element and to move the bread therefrom at the completion of a toasting operation including a device that is normally under strain to move the toast away from the element, a plurality of heat responsive latches, each including a heat responsive element, said latches being mounted for common movements and adapted and arranged to successively act upon said device that is normally under strain to move the bread away from the heating element to reset the same in a retracted position and to hold the same retracted during the toasting period, the heat responsive element of an operatively positioned latch being subject to heat from the heating element and responsive thereto to trip the latch, and the heat responsive element of an inoperatively positioned latch being in a cooling position remote from the heating element, the heat responsive latches being arranged to have singular cam-acting engagement with the device that is under strain to move bread away from the heating element to automatically reset the same during movement of a last operative latch to an inoperative position and another thereof to an operative position.

3. In a toaster having a heating element, means for supporting bread in close relation to said heating element and to move the bread away from the element at the completion of the toasting operation including a device that is normally under strain to move the bread away from the element, a plurality of heat responsive latches each including a heat responsive element, means whereby said latches will act successively upon the said device that is normally under strain to move the bread away from the heating element to hold the same in a retracted position during a toasting operation, the heat responsive element of an operatively positioned latch being subject to heat from the heating element and responsive thereto to move and trip the latch after a predetermined amount of heat has been applied to the bread, and a toasting interval time regulating device comprising a shutter between said heating element and an operatively positioned latch, that is adjustable to vary the amount of heat applied to the operative latch.

4. In a toaster, the combination with a heating element, means for supporting bread in close relation to the heating element during the toasting period and ejecting the same from the element at the completion of a toasting period including a leaf ejector spring operative on and normally under strain to eject bread from a toasting position, a plurality of heat responsive latches mounted for common rotary movements and each including a heat responsive element, means whereby under rotary movements said latches will act successively upon said ejecting spring to retract the same and hold the same retracted during the toasting period, a partition between said latches and said element and having an aperture therein, an operatively positioned latch being closely associated and aligned with said aperture to receive heat therethrough from the heating element and responsive to the heat to move and trip the latch, and a heat responsive element of an inoperative latch being shielded from the heat of said element by said partition and the operatively positioned latch.

5. The structure defined in claim 4 in which automatic retraction of the leaf-ejecting spring is accomplished by cam action of one of the latches on the ejector spring during movement of an operatively positioned latch to an inoperative position and movement of another thereof to an operative position.

6. The structure defined in claim 4 in which automatic retraction of the leaf-ejecting spring is accomplished by cam action of one of the latches on the ejector spring during movement of an operatively positioned latch to an inoperative position and movement of another thereof to an operative position, and an adjustable shutter for said aperture operative to vary the amount of the heat delivered to an operative latch and thereby regulate the time of a toasting interval.

7. The structure defined in claim 4 in further combination with a circuit for said heating element and a mercury bulb switch in said circuit and carried by said ejector spring in such a manner that it will be moved to a closed position when said ejector spring is retracted and to an open position when said ejector spring is in an ejected position.

8. In a toaster, the combination with an oven, of means for supporting bread in the oven during a toasting operation, and to move the same from the oven at the completion of a toasting operation including an ejector normally under strain to move the bread out of the oven, means for retracting the ejector, and holding the same retracted during toasting operation including a plurality of heat-responsive latches mounted for common movements and operative progressively upon the ejector to retract and hold the same retracted, and a heating element so arranged in respect to the heat-responsive latches that an operatively positioned latch will be subject to heat therefrom and an inoperatively positioned latch will be remote therefrom, one of said heat responsive latches being operative upon the ejector to automatically retract the same during the movements of a last operated latch to an inoperative position and an inoperative one thereof to an operative position.

9. In a toaster, the combination with an oven, means for supporting bread in the oven during a toasting period and moving the bread from the oven at the completion of a toasting period, including a device normally under strain to move the toast from the oven, means for retracting the device normally under strain and holding the same retracted during a toasting period including a plurality of heat-responsive latch elements mounted for common rotary movements and being progressively operative upon the device that is normally under strain, and a heating element so arranged in respect to the latch elements that an operatively positioned latch element will be subject to heat therefrom and an inoperatively positioned latch element will be remote therefrom, the heat-responsive latch elements having cam-acting engagement with and operating to automatically retract the device that is normally under strain during the movements of a next operative latch element to an operative position.

10. In a toaster, the combination with a heating element, means for supporting bread in close relation to the heating element during the toasting period and ejecting the same from the heating element at the completion of a toasting period, including a leaf ejector spring operative on and normally under strain to eject bread from a toasting position, a plurality of heat responsive latches mounted for common rotary movements and constructed and arranged to act successively upon the leaf ejector spring, under rotary movements, to retract the same and hold the same retracted during the toasting period, and operatively positioned of said heat responsive latches being subject to heat from the heating element and inoperatively positioned thereof being remote from the heating element and substantially unaffected by heat therefrom.

11. The structure defined in claim 10 in which the latches have cam-acting engagement with the leaf ejector spring and are operative singularly thereon during movements of an operatively positioned latch to an inoperative position and on said latches to an operative position.

12. In a toaster, the combination with an oven, means for supporting bread in the oven during a toasting period and moving the bread from the oven at the completion of a toasting period, including a device normally under strain to move the toast from the oven, means for retracting the device normally under strain and holding the same retracted during a toasting period including a plurality of heat-responsive latch elements mounted for common rotary movements and being progressively operative by cam action upon the device that is normally under strain to automatically retract the same during movement of a next operative latch element to an operative position, and a heating element so arranged in respect to the latch elements that an operatively positioned latch element will be subject to heat therefrom and an inoperatively positioned latch element will be remote therefrom, said heat-responsive latch elements having cam-acting engagement with and automatically retract the device that is normally under strain during movement of a next operative latch element to an operative position.

13. In combination with a heating element, means for supporting material to be heated in close relation to the heating element and to eject material therefrom including a leaf spring arranged to be operative on the material and normally under strain to move the material away from the heating element, means for retracting the ejecting spring, and a plurality of heat responsive latches each including a heat responsive element, means whereby said latches will successively operate on said spring to hold the same in a retracted position, the heat responsive element of an operative latch being subject to heat from said heating element and responsive thereto to trip the latch and permit said ejecting spring to move under its own tension and eject the material away from the heating element, said ejecting spring being operative directly on the material to be heated.

CLINTON D. AVERY.